United States Patent
Si et al.

(10) Patent No.: US 9,709,989 B2
(45) Date of Patent: Jul. 18, 2017

(54) LASER AUTOMATICALLY GUIDED VEHICLE (AGV) WITHOUT REFLECTING PANEL AND NAVIGATION METHOD THEREOF

(71) Applicant: Suzhou AGV Robot Co., ltd, Suzhou (CN)

(72) Inventors: Xiufen Si, Suzhou (CN); Shengming Liu, Suzhou (CN); Min Luo, Suzhou (CN); Hongzhang Jiang, Suzhou (CN); Jiashuai Zhong, Suzhou (CN)

(73) Assignee: Suzhou AGV Robot Co., ltd, Suzhou (CN)

(*) Notice: Subject to any disclaimer, the term of this patent is extended or adjusted under 35 U.S.C. 154(b) by 0 days.

(21) Appl. No.: 15/236,570

(22) Filed: Aug. 15, 2016

(65) Prior Publication Data

US 2016/0349757 A1    Dec. 1, 2016

Related U.S. Application Data

(63) Continuation of application No. PCT/CN2015/073013, filed on Feb. 13, 2015.

(30) Foreign Application Priority Data

Feb. 13, 2014    (CN) .......................... 2014 1 0049482

(51) Int. Cl.
*G05D 1/02* (2006.01)
*G01S 7/48* (2006.01)
(Continued)

(52) U.S. Cl.
CPC .......... *G05D 1/0231* (2013.01); *G01S 7/4808* (2013.01); *G01S 7/4817* (2013.01);
(Continued)

(58) Field of Classification Search
CPC .............. G05D 1/0231; G05D 1/0274; G05D 2201/0216; G01S 7/4808; G01S 7/4817;
(Continued)

(56) References Cited

U.S. PATENT DOCUMENTS

| 2015/0091374 A1* | 4/2015 | Lenius .................... H02J 17/00 307/9.1 |
| 2015/0158587 A1* | 6/2015 | Patrick .................. B64C 39/024 244/137.4 |

(Continued)

*Primary Examiner* — Jelani Smith
*Assistant Examiner* — James E Stroud
(74) *Attorney, Agent, or Firm* — Wayne & King LLC

(57) ABSTRACT

The present invention relates to the technical field of transportation devices. Provided is a laser automatically guided vehicle (AGV) without a reflecting panel, comprising: a laser scanner (1), a vehicle (2), an upper computer system, a lower computer system, an execution mechanism (3) and an input/output device; the upper computer system receives electric signals from the laser scanner (1) and processes the electric signals to make an original map and an effective map, and plans a route to obtain the shortest route, and then sends a control instruction to the execution mechanism (3); a turning encoder and an angle sensor transmit data such as turning speed and angle to the upper computer system to realize feedback control, thereby conducting autonomous navigation of the vehicle. The laser automatically guided vehicle (AGV) without a reflecting panel can achieve positioning and obstacle avoidance for the laser automatically guided vehicle (AGV) without the installation of a reflecting panel, thus improving environmental adaptability.

6 Claims, 4 Drawing Sheets

(51) Int. Cl.
*G01S 7/481* (2006.01)
*G01S 17/08* (2006.01)
*G01S 17/93* (2006.01)
*G01S 17/42* (2006.01)
*G01S 17/89* (2006.01)

(52) U.S. Cl.
CPC .............. *G01S 17/08* (2013.01); *G01S 17/42* (2013.01); *G01S 17/89* (2013.01); *G01S 17/936* (2013.01); *G05D 1/0274* (2013.01); *G05D 2201/0216* (2013.01)

(58) Field of Classification Search
CPC .......... G01S 17/08; G01S 17/42; G01S 17/89; G01S 17/936
USPC .......................................................... 701/24
See application file for complete search history.

(56) References Cited

U.S. PATENT DOCUMENTS

2015/0197225 A1* 7/2015 Raste .............. B60W 30/18145
701/72
2017/0003380 A1* 1/2017 Chung .................... G01S 17/42

* cited by examiner

LASER AUTOMATICALLY GUIDED VEHICLE (AGV) WITHOUT REFLECTING PANEL AND NAVIGATION METHOD THEREOF

CROSS-REFERENCE TO RELATED APPLICATIONS

This application is a continuation of International Patent Application No. PCT/CN2015/073013 with a filing date of Feb. 13, 2015, designating the United States, now pending, and further claims priority to Chinese Patent Application No. 201410049482.X with a filing date of Feb. 13, 2014. The content of the aforementioned applications, including any intervening amendments thereto, are incorporated herein by reference.

TECHNICAL FIELD

The present invention relates to a technical field of transportation equipment, and particularly relates to a laser automatic guided vehicle (AGV) without reflective plates.

BACKGROUND OF THE PRESENT INVENTION

An automatic guided vehicle (AGV) means an a transportation vehicle equipped with an automatic electromagnetic guiding device or an automatic optical guiding device and others, capable of driving along a specified guide path and having functions of vehicle programming and stopping device, safety protection and various move loadings. In recent years, as modern logistics and relevant technology are developed rapidly in China, AGV has been widely applied in a logistics system and a flexible manufacturing system, and the degree of production automation and production efficiency are greatly improved by virtue of high efficiency, fastness and flexibility. Laser guide is an advanced guidance mode adopted since the mid 90s, and an unique guidance mode without land disposal except for GPS; and with regard to a laser AGV, a laser scanner and a reflective plate arranged around an operation area of the AGV beforehand are taken as a basic environment required for laser positioning, which mainly finishes path planning, positioning, obstacle avoidance and other tasks.

With regard to the existing laser AGV, at least three high-brightness reflective plates should be arranged in the operation area, the laser scanner can detect the high-brightness reflective plates only, a series of reflection angles of the reflective plates can be obtained after one week of laser scanning, and then, positioning is carried out according to the obtained data. The reflective plate is crucial in installation, and must be installed in the operation area; and the reflective plates should be reinstalled when the laser AGV is arrived at a new area. In addition, the position of the reflective plates must be fixed, and if the reflective plates are moved carelessly, AGV loses its position, and the flexibility and accuracy are relatively poor.

Solution to Problems

Technical Solution

In order to solve the above technical problems, one purpose of the present invention is to provide a laser automatic guided vehicle (AGV) without reflective plates capable of positioning and obstacle avoidance of the same without installing reflective plates.

The laser AGV without the reflective plates of the present invention comprises a laser scanner, a vehicle body, an upper computer system, a lower computer system, actuators and an input/output device, wherein the laser scanner is electrically connected with the upper computer system, and used for receiving the reflected laser and converting the reflected laser into an electric signal to transmit to the upper computer system;

The upper computer system is electrically connected with the lower computer system, builds a map according to the electric signal sent by the laser scanner, carries out path planning based on the map, sends a control instruction to the lower computer system, and controls the operation of the laser AGV without the reflective plates;

The input/output device is connected with the lower computer system, and used for receiving the control instruction sent by an operator and displaying state information in the laser AGV without the reflective plates;

The actuators are rotatablely connected below the vehicle body, and used for driving the laser AGV without the reflective plates to operate.

Further, according to the laser AGV without the reflective plates of the present invention, each actuator comprises a fixed plate, a left actuator and a right actuator, wherein the left actuator and the right actuator are arranged at the left side and the right side of the fixed plate respectively. Each actuator comprises a wheel, a motor, a driver and a rotary encoder, wherein a main shaft of the wheel is connected with a main shaft of the motor, and the wheels in the left actuator and the right actuator are used for producing speed difference and driving the actuators to turn, thereby driving the vehicle body to operate. The motor is electrically connected with the driver, and the driver is electrically connected with the lower computer system and used for driving the rotation of the motor; and an input shaft of the rotary encoder is connected with the main shaft of the motor, and the rotary encoder is electrically connected with the lower computer system and used for feeding the rotating speed and corner data of the motor back to the lower computer system.

Further, the laser AGV without the reflective plates of the present invention further comprises an angle sensor and a driven shaft, wherein the driven shaft is vertically arranged on the fixed plate; and the angle sensor is fixedly connected with the driven shaft, electrically connected with the lower computer system, and used for detecting data of an included angle between the actuators and the vehicle body and transferring the data to the upper computer system through the lower computer system.

Further, according to the laser AGV without the reflective plates of the present invention, the input/output device comprises a touch screen, a button, a remote controller, an audio output device and an obstacle sensor, wherein the touch screen, the button, the audio output device and the obstacle sensor are electrically connected with the lower computer system respectively, the button is used for starting or closing the laser AGV without the reflective plates, the audio output device is used for prompting internal state data of the laser AGV without the reflective plates, the obstacle sensor is used for stopping the operation of the laser AGV without the reflective plates when encountering an obstacle, and the remote controller is in wireless connection with the upper computer system or the lower computer system and used for controlling the operation of the laser AGV without the reflective plates.

Preferably, according to the laser AGV without the reflective plates of the present invention, the upper computer system is one of an industrial control computer or an MCU controller.

Preferably, according to the laser AGV without the reflective plates of the present invention, the lower computer system is one of the MCU controller or a PLC.

Preferably, according to the laser AGV without the reflective plates of the present invention, the lower computer system is integrated in the upper computer system.

Compared with an existing art, the laser AGV without the reflective plates of the present invention has the beneficial effects: the laser AGV without the reflective plates of the present invention comprises a laser scanner and an upper computer system. The upper computer system processes an electric signal sent by the laser scanner after receiving the same, builds an original map and defines on the original map; an effective map is obtained by removing a non-safe area and stored in the upper computer system; after a destination point is set, the path planning is carried out by the upper computer system according to the built map, a shortest path accessing to the destination is found, the control instruction is sent to the actuators according to the shortest path, and the operation of the laser AGV without the reflective plates is controlled; and during the period, the rotary encoder sends a rotating speed, angle and other data to the upper computer system through the lower computer system with the angle sensor, thereby achieving the purpose of carrying feedback control of the upper compute system and further adjusting the rotating speed and posture of the wheel in the actuators until to arrive the set destination. To sum up, the laser AGV without the reflective plates of the present invention realizes the autonomous navigation by building the original map and the effective map, rather than calculating the position of a laser AGV with reflective plates through the laser reflected by the reflective plates.

The other purpose of the present invention is to provide an autonomous navigation method of a laser AGV without reflective plates to realize the automatic navigation of the laser AGV without the reflective plates, comprising the following steps:

A: opening the laser AGV without the reflective plates, and setting the same at a remote control mode;

B: controlling the laser AGV without the reflective plates to operate in the area to be arrived with the remote controller. The laser scanner converts the laser reflected back into the electric signal when scanning an object, and sends the electric signal to the upper computer system;

C: the upper computer system processes the electric signal sent by the laser scanner, builds the original map, expresses the scanned object contour in the original map with a black line, builds the original map completely until the laser AGV without the reflective plates is operated in the area to be arrived once, and stores the original map;

D: an operator defines the original map, artificially shields the non-safe area opened conditionally to obtain an effective map, and stores the effective map in the upper computer system;

E: the operator sets an initial point and a target point of the laser AGV without the reflective plates in the effective map, and sets the laser AGV without the reflective plates at an autonomous mode;

F: the upper computer system carries out the path planning to plan the shortest path, and sends the control instruction and walking data to the lower computer system;

0: the lower computer system sends the control instruction to the actuators and drives the operation of the laser AGV without the reflective plates; in the process, the rotary encoder sends the data to the upper computer system continuously, the upper computer system carries out PID closed-loop control, until to arrive at the set destination point, and the operation is finished; and if the laser scanner of the laser AGV without the reflective plates scans that an obstacle is presented in a certain distance ahead in the operation process, turn to Step H;

H: the upper computer system carries out synchronous processing on the effective map according to the scanned obstacle information, marks the obstacle in the effective map, stores the effective map, and carries out the path planning again according to the effective map which has been synchronized; and if the upper computer system calculates that the laser AGV without the reflective plates can pass through the obstacle, turn to Step G, otherwise, turn to Step I;

I: the upper computer system stops the operation of the laser AGV without the reflective plates. Turn to Step G until the obstacle is left.

Beneficial Effects of the Invention

Beneficial Effects

Compared with the existing art, the automatic navigation method of the laser AGV without the reflective plates of the present invention has the beneficial effects that: when the laser AGV without the reflective plates encounters the obstacle in the operation process, the upper computer system marks the obstacle in the original effective map with the black line to realize the synchronous update of the effective map, re-plans the shortest path accessing to the destination, and drives the laser AGV without the reflective plates to arrive at the destination, thereby enhancing the environmental suitability of the laser AGV without the reflective plates of the present invention. To sum up, the automatic navigation of the laser AGV without the reflective plates is realized by executing the steps in the automatic navigation method of the laser AGV without the reflective plates. Compared with the laser AGV for positioning with reflective plates, the influence of the outside world to the laser AGV without the reflective plates is relatively small, so that the laser AGV without the reflective plates can be suitable for all kinds of occasions; and moreover, the environmental suitability is stronger.

Figure 1:
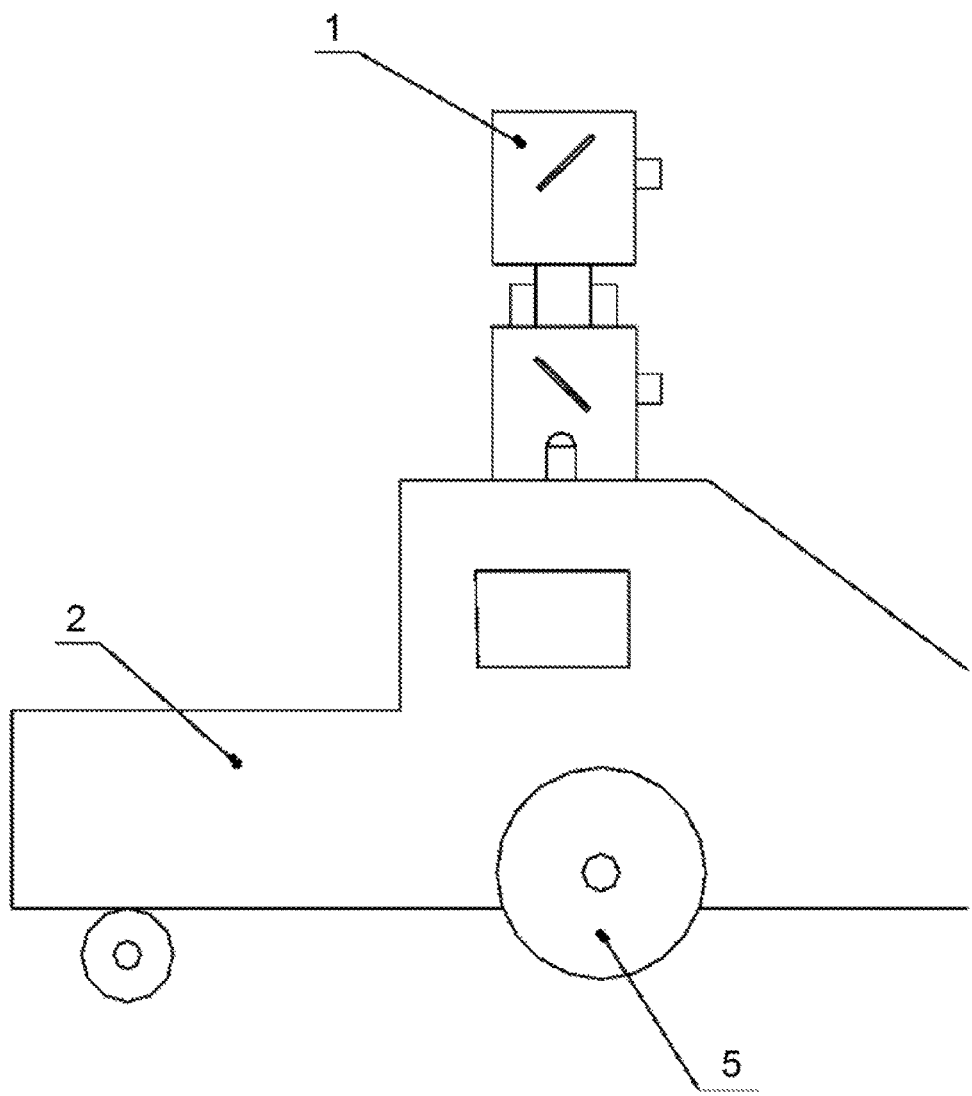
FIG. 1 is a diagram for a main view of a laser AGV without the reflective plates of the present invention.

In the drawings, 1: laser scanner; 2: vehicle body; 3: actuator; 4: fixed plate; 5: wheel; 6: motor; 7: driver; 8: rotary encoder, 9: angle sensor; 10: driven shaft.

DETAILED DESCRIPTION OF PREFERRED EMBODIMENTS

The further detailed description is made for the specific implementation mode of the present invention in combination with the figures and embodiments below. The following embodiment is used for explaining the present invention, but not used for limiting the scope of the present invention.

Figure 2:
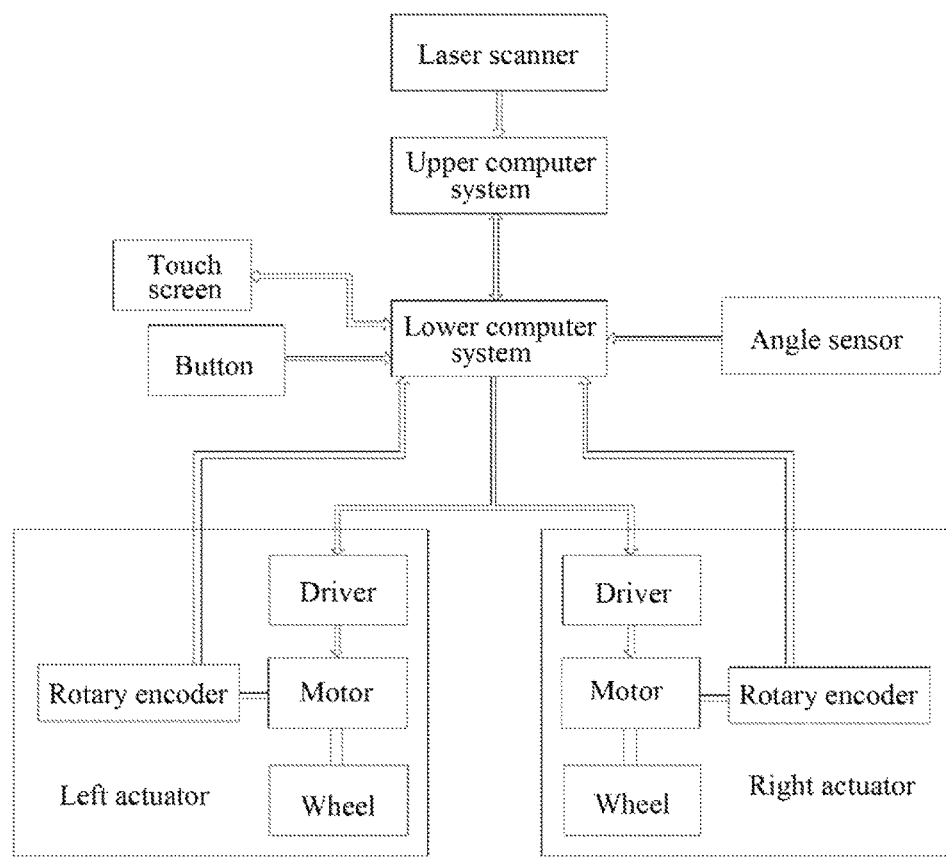
FIG. 2 is a structural diagram of a laser AGV without the reflective plates of the present invention.
Figure 3:
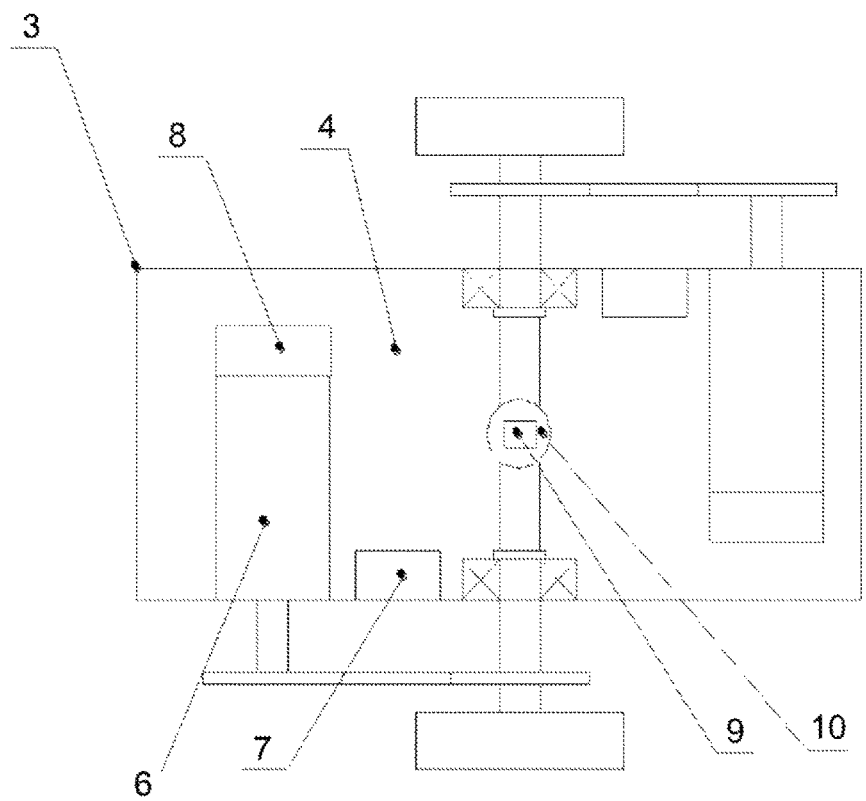
FIG. 3 is a diagram for a main view of an actuator of a laser AGV without the reflective plates of the present invention.

As shown in FIGS. 1-3, the laser AGV without the reflective plates of the present invention comprises a laser scanner 1, a vehicle body 2, an upper computer system, a lower computer system, actuators 3 and an input/output device, wherein the laser scanner is electrically connected with the upper computer system, and used for receiving the reflected laser and converting the same into an electric signal to transmit to the upper computer system;

The upper computer system is electrically connected with the lower computer system, builds a map according to the electric signal sent by the laser scanner, carries out path planning based on the map, sends a control instruction to the lower computer system, and controls the operation of the laser AGV without the reflective plates;

The input/output device is connected with the lower computer system, and used for receiving a control instruction sent by an operator and displaying state information in the laser AGV without the reflective plates. The input/output device comprises a touch screen, a button, a remote controller, an audio output device and an obstacle sensor, wherein the touch screen, the button, the audio output device and the obstacle sensor are electrically connected with the lower computer system respectively, the button is used for starting or closing the laser AGV without the reflective plates, the audio output device is used for prompting internal state data of the laser AGV without the reflective plates, the obstacle sensor is used for stopping the operation of the laser AGV without the reflective plates when encountering an obstacle, and the remote controller is in wireless connection with the upper computer system or the lower computer system and used for controlling the operation of the laser AGV without the reflective plates.

The actuators are rotatably connected below the vehicle body, and used for driving the laser AGV without the reflective plates to operate. Each actuator comprises a fixed plate 4, a left actuator and a right actuator, wherein the left actuator and the right actuator are arranged at the left side and the right side of the fixed plate respectively. Each actuator comprises a wheel 5, a motor 6, a driver 7 and a rotary encoder 8, wherein a main shaft of the wheel is connected with a main shaft of the motor, and the wheels in the left actuator and the right actuator are used for producing speed difference and driving the actuators to turn, thereby, driving the vehicle body to operate. The motor is electrically connected with the driver, and the driver is electrically connected with the lower computer system and used for driving the rotation of the motor; and an input shaft of the rotary encoder is connected with the main shaft of the motor, and the rotary encoder is electrically connected with the lower computer system and used for feeding the rotating speed and corner data of the motor back to the lower computer system.

In specific implementation, the laser AGV without the reflective plates is firstly set at a remote control mode, and the operator controls the laser AGV without the reflective plates to operate in the area to be operated once through a remote controller; and in this process, the laser scanner emits laser around continuously, converts the laser reflected by the object into the electric signal, and uploads the electric signal to the upper computer system; and the upper computer system processes the electric signal sent by the laser scanner after receiving the same, the specific position from the object to the laser AGV without the reflective plates can be calculated according to the time from emitting the laser to receive the reflected laser and angle information of the laser sent by the laser scanner, the upper computer system builds the original map accordingly, and when the laser AGV without the reflective plates operates in the area to be operated completely, the original map is built completely. Subsequently, an operator makes definition on the original map, and isolates the non-safe area, thereby obtaining the effective map. Then, the operator sets the laser AGV without the reflective plates at an autonomous mode and sets an initial point and a target point, and the upper computer system carries out the path planning according to the effective map to obtain the shortest path, and sends the control instruction to the actuators, thereby controlling the operation of the laser AGV without the reflective plates. During the period, the rotary encoder transfers a rotating speed and other data to the upper computer system through the lower computer system, thereby realizing the feedback control of the upper computer system to the actuators, and further adjusting the rotating speed of the wheel in the actuators, until to arrive at the set destination. To sum up, the laser AGV without the reflective plates of the present invention can realize the autonomous navigation without the need for the reflective plates.

Preferably, the laser AGV without the reflective plates of the present invention further comprises an angle sensor 9 and a driven shaft 10, wherein the driven shaft is vertically arranged on the fixed plate; and the angle sensor is fixedly connected with the driven shaft, electrically connected with the lower computer system, and used for detecting data of an included angle between the actuator and the vehicle body and transferring the data to the upper computer system through the lower computer system.

An angle sensor is arranged, so that the upper computer system can obtain the relative position of the vehicle body relative to the actuators from the angle information sent by the angle sensor, i.e. angle data, thereby obtaining contour information of the vehicle body, and avoiding the collision of a contour of the vehicle body and the outside object or the obstacle in the operation process of the laser AGV without the reflective plates.

Preferably, according to the laser AGV without the reflective plates of the present invention, the upper computer system is one of an industrial control computer or an MCU controller, wherein the MCU controller, i.e. a micro control unit, includes an ARM, a single chip microcomputer, and the like.

Preferably, according to the laser AGV without the reflective plates of the present invention, the lower computer system is one of the MCU controller or a PLC.

Preferably, according to the laser AGV without the reflective plates of the present invention, the lower computer system is integrated in the upper computer system.

Figure 4:
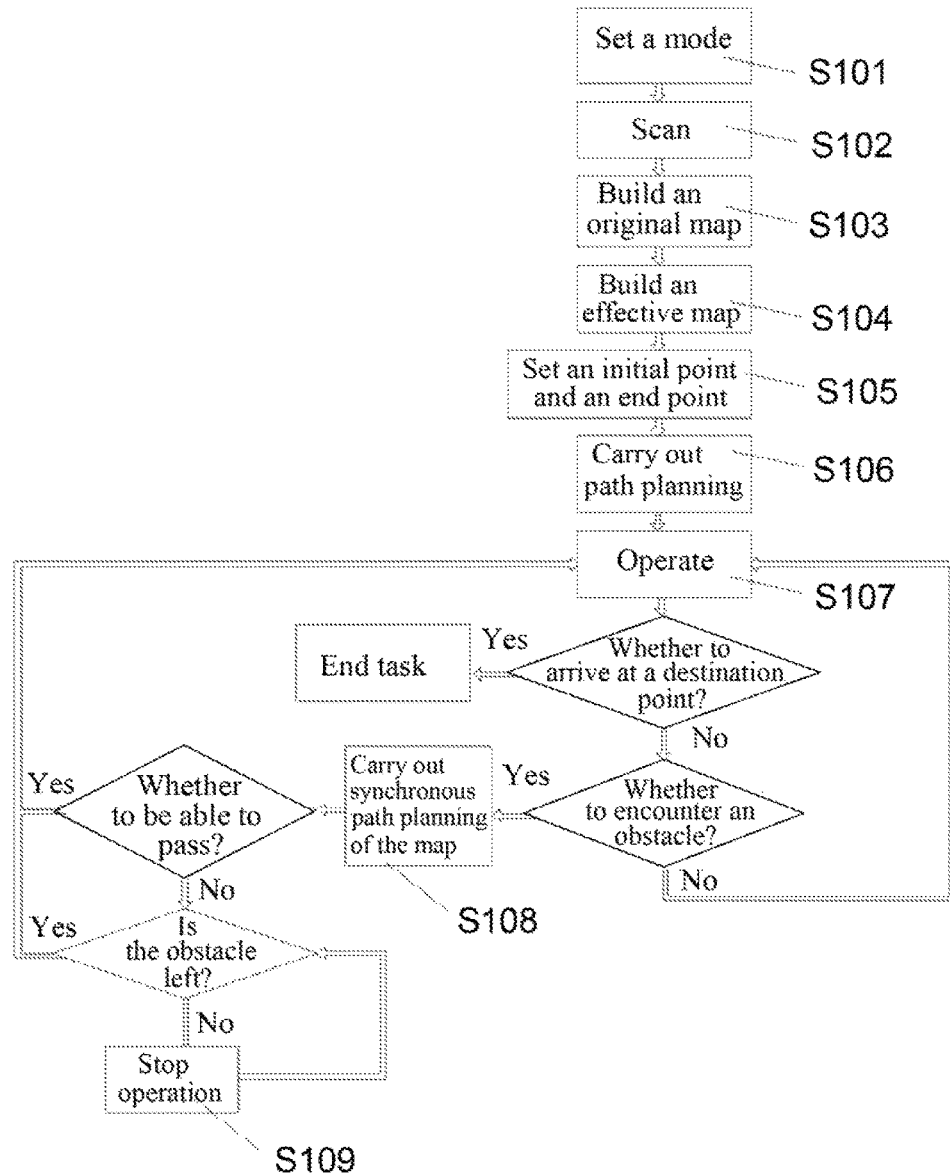
FIG. 4 is a work flow diagram of an automatic navigation method of a laser AGV without the reflective plates of the present invention.

As shown in FIG. 4, the autonomous navigation method of the laser AGV without the reflective plates of the present invention comprises the following steps:

S101: the laser AGV without the reflective plates is started and set at a remote control mode;

S102: the laser AGV without the reflective plates is controlled to operate in the area to be arrived with the remote controller, wherein the laser scanner converts the laser reflected back into the electric signal when scanning an object, and sends the electric signal to the upper computer system;

S103: the upper computer system processes the electric signal sent by the laser scanner, builds the original map, expresses the scanned object contour in the original map with a black line, builds the original map completely until the laser AGV without the reflective plates is operated in the area to be arrived once, and stores the original map;

S104: an operator defines the original map, artificially shields the non-safe area opened conditionally to obtain an effective map, and stores the effective map in the upper computer system;

S105: the operator sets an initial point and a target point of the laser AGV without the reflective plates in the effective map, and sets the laser AGV without the reflective plates at an autonomous mode;

S106: the upper computer system carries out the path planning to plan the shortest path, and sends the control instruction and walking data to the lower computer system;

S107: the lower computer system sends the control instruction to the actuator, and drives the operation of the laser AGV without the reflective plates; in the process, the rotary encoder sends the data to the upper computer system continuously, the upper computer system carries out PID closed-loop control, until to arrive at the set destination point, and the operation is finished; and if the laser scanner of the laser AGV without the reflective plates scans that an obstacle is presented in a certain distance ahead in the operation process, turn to Step S108;

S108: the upper computer system carries out synchronous processing on the effective map according to the scanned obstacle information, marks the obstacle in the effective map, stores the effective map, and carries out the path planning again according to the effective map which has been synchronized; and if the upper computer system calculates that the laser AGV without the reflective plates can pass through the obstacle, turn to Step S107, otherwise, turn to Step S109;

S109: the upper computer system stops the operation of the laser AGV without the reflective plates. Turn to Step S107 until the obstacle is left.

When the laser AGV without the reflective plates encounters the obstacle in the operation process, the upper computer system marks the obstacle in the original effective map with the black line to realize the synchronous update of the effective map, re-plans the shortest path accessing to the destination, and drives the laser AGV without the reflective plates to arrive at the destination, thereby enhancing the environmental suitability of the laser AGV without the reflective plates of the present invention. To sum up, the automatic navigation of the laser AGV without the reflective plates is realized by executing the steps in the automatic navigation method of the laser AGV without the reflective plates. Compared with the laser AGV for positioning with reflective plates, the influence of the outside world on the laser AGV without the reflective plates is relatively small, so that the laser AGV without the reflective plates can be suitable for all kinds of occasions; and moreover, the environmental suitability is stronger.

The above only describes preferred embodiments of the present invention. It should be pointed out that, those ordinary skilled in the art also can make several improvements and deformations without departing from the technical principle of the present invention, and the improvements and deformations should also be regarded as the scope of protection of the present invention.

We claim:

1. A laser guided AGV without any reflective plate, comprising:
   a laser scanner,
   a vehicle body,
   an upper computer system,
   a lower computer system,
   an actuator,
   an input/output device,
   an angle sensor, and
   a driven shaft;
   wherein the laser scanner is electrically connected with the upper computer system, and used for receiving reflected laser and for converting the reflected laser into an electric signal which is then transmitted to the upper computer system;
   wherein the upper computer system is electrically connected with the lower computer system, and configured for building a map according to the electric signal provided by the laser scanner, for carrying out path planning based on the map, and for sending a control instruction to the lower computer system to control operation of the laser guided AGV without any reflective plate;
   wherein the input/output device is connected with the lower computer system, and used for receiving a control instruction sent by an operator and for displaying state information of the laser guided AGV without any reflective plate;
   wherein the actuator is rotatablely connected below the vehicle body, and used for driving the laser guided AGV without any reflective plate;
   wherein the actuator comprises:
     a fixed plate;
     a left actuator arranged at a left side of the fixed plate; and
     a right actuator arranged at a right side of the fixed plate;
     each of the left and right actuators comprises a wheel, a motor, a driver and a rotary encoder;
     a main shaft of the wheel is connected with a main shaft of the motor, and the wheels in the left and right actuators are capable of producing speed difference to drive the actuator to turn, and hence drive the vehicle body to move;
     the motor is electrically connected with the driver;
     the driver is electrically connected with the lower computer system and used for driving the motor to rotate; and
     an input shaft of the rotary encoder is connected with the main shaft of the motor, and the rotary encoder is electrically connected with the lower computer system and used for feeding a rotation speed and a rotation angle of the motor back to the lower computer system;
   wherein the driven shaft is vertically arranged on the fixed plate; and
   wherein the angle sensor is fixedly connected with the driven shaft, electrically connected with the lower computer system, and used for detecting an included angle between the actuator and the vehicle body and sending the included angle to the upper computer system through the lower computer system.

2. The laser guided AGV without any reflective plate of claim 1, wherein, the input/output device comprises a touch screen, a button, a remote controller, an audio output device and an obstacle sensor; the touch screen, the button, the audio output device and the obstacle sensor are electrically connected with the lower computer system respectively; the button is used for starting or stopping the laser guided AGV without any reflective plate; the audio output device is used for prompting the state information of the laser guided AGV without any reflective plate; the obstacle sensor is used for stopping the operation of the laser guided AGV without any reflective plate when encountering an obstacle; and the remote controller is in wireless connection with the upper computer system or the lower computer system and used for controlling the operation of the laser guided AGV without any reflective plate.

3. The laser guided AGV without any reflective plate of claim 2, wherein, the upper computer system is an industrial control computer or an MCU.

4. The laser guided AGV without any reflective plate of claim 3, wherein, the lower computer system is the MCU or a PLC.

5. The laser guided AGV without any reflective plate of claim 4, wherein, the lower computer system is integrated in the upper computer system.

6. An automatic navigation method for the laser guided AGV without any reflective plate of claim 5, comprising the following steps:
   A: opening the laser guided AGV without any reflective plate, and setting the same at a remote control mode;
   B: controlling the laser guided AGV without any reflective plate to operate in an operation region via the remote controller; wherein the laser scanner converts the laser reflected back into the electric signal when scanning an object, and sends the electric signal to the upper computer system;
   C: the upper computer system processing the electric signal provided by the laser scanner, building an original map, and displaying the scanned object contour in the original map with a black line; wherein the original map is completely built until the laser guided AGV without any reflective plate has already been operated in the operation region once, and the original map is stored in the upper computer system;
   D: defining the original map by artificially shielding a non-safe area opened conditionally so as to obtain an effective map, and storing the effective map in the upper computer system;
   E: presetting an initial point and a destination point in the effective map for the laser guided AGV without any reflective plate, and setting the laser guided AGV without any reflective plate at an automatic mode;
   F: the upper computer system carrying out the path planning to obtain a shortest path, and sending the control instruction and walking data to the lower computer system;
   G: the lower computer system sending the control instruction to the actuator and driving the operation of the laser guided AGV without any reflective plate; wherein in this process, the rotary encoder sends data to the upper computer system continuously, the upper computer system carries out PID closed-loop control until the preset destination point is arrived, and the operation is stopped; and in operation process, if the laser scanner of the laser guided AGV without any reflective plate scans that an obstacle is presented in a certain distance ahead, turning to Step H;
   H: the upper computer system carrying out synchronous processing to the effective map according to the scanned obstacle information, marking the obstacle in the effective map, and storing the effective map; then the upper computer system carrying out the path planning again according to the effective map which has been synchronized; and if the upper computer system calculates out that the laser guided AGV without any reflective plate can pass through the obstacle, turning to Step G, otherwise, turning to Step I;
   I: the upper computer system stopping the operation of the laser guided AGV without any reflective plate; turning to Step G until the obstacle is left.

* * * * *